(12) United States Patent
Chuang et al.

(10) Patent No.: US 10,416,420 B2
(45) Date of Patent: Sep. 17, 2019

(54) OPTICAL LENS

(71) Applicant: Coretronic Corporation, Hsin-Chu (TW)

(72) Inventors: Fu-Ming Chuang, Hsin-Chu (TW); Hsin-Hsiang Lo, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 15/671,146

(22) Filed: Aug. 8, 2017

(65) Prior Publication Data

US 2018/0045925 A1 Feb. 15, 2018

(30) Foreign Application Priority Data

Aug. 9, 2016 (CN) .......................... 2016 1 0644863

(51) Int. Cl.
  *G02B 13/06* (2006.01)
  *G02B 13/00* (2006.01)
  *G02B 15/167* (2006.01)
  *G02B 9/62* (2006.01)

(52) U.S. Cl.
  CPC .............. *G02B 13/06* (2013.01); *G02B 9/62* (2013.01); *G02B 13/0045* (2013.01); *G02B 15/167* (2013.01)

(58) Field of Classification Search
  CPC ...... G02B 13/06; G02B 17/08; G02B 17/086; G02B 17/0808; G02B 27/1066; G02B 17/0856; G02B 17/0892; G02B 17/0896; G02B 23/243; G02B 3/0056;
  (Continued)

(56) References Cited

U.S. PATENT DOCUMENTS

| 8,254,040 B2 | 8/2012 | Peng et al. |
| 9,103,962 B2 | 8/2015 | Liao et al. |
| 2008/0252991 A1 | 10/2008 | Wang |

(Continued)

FOREIGN PATENT DOCUMENTS

| CN | 201293863 | 8/2009 |
| CN | 104423022 | 3/2015 |

(Continued)

OTHER PUBLICATIONS

"Search Report of European Counterpart Application," dated Nov. 24, 2017, p. 1-p. 8.

*Primary Examiner* — Evan P Dzierzynski
*Assistant Examiner* — Sharrief I Broome
(74) *Attorney, Agent, or Firm* — JCIPRNET (57) ABSTRACT

An optical lens includes a first lens group and a second lens group. The first lens group includes a first lens, a second lens, and a third lens arranged in sequence from a magnified side towards a reduced side. Refractive powers of the first lens, the second lens, and the third lens are negative, negative and positive respectively. The third lens is a glass lens. The second lens group is disposed between the first lens group and the reduced side. The second lens group includes a fourth lens, a fifth lens, and a sixth lens arranged in sequence from the magnified side towards the reduced side. Refractive powers of the fourth lens, the fifth lens, and the sixth lens are positive, negative and positive respectively. The first lens, the second lens, the fourth lens, the fifth lens and the sixth lens are plastic lenses.

12 Claims, 4 Drawing Sheets

(58) Field of Classification Search
CPC ........ G02B 27/0025; G02B 3/04; G02B 5/04;
G02B 13/08; G02B 13/18; G02B 17/0804
USPC .................................................. 359/700–871
See application file for complete search history.

(56) References Cited

U.S. PATENT DOCUMENTS

| | | | |
|---|---|---|---|
| 2010/0142062 A1* | 6/2010 | Asami | G02B 13/04 |
| | | | 359/793 |
| 2012/0050892 A1* | 3/2012 | Lai | G02B 13/0045 |
| | | | 359/786 |
| 2014/0139719 A1* | 5/2014 | Fukaya | G02B 13/0045 |
| | | | 348/340 |
| 2014/0204477 A1* | 7/2014 | Asami | G02B 13/06 |
| | | | 359/738 |
| 2014/0204479 A1 | 7/2014 | Asami et al. | |
| 2015/0362703 A1* | 12/2015 | Park | G02B 13/0045 |
| | | | 359/713 |

FOREIGN PATENT DOCUMENTS

| | | |
|---|---|---|
| CN | 103576290 | 1/2016 |
| JP | H01303409 | 12/1989 |

* cited by examiner

OPTICAL LENS

CROSS-REFERENCE TO RELATED APPLICATION

This application claims the priority benefit of China application serial no. 201610644863.1, filed on Aug. 9, 2016. The entirety of the above-mentioned patent application is hereby incorporated by reference herein and made a part of this specification.

BACKGROUND

1. Field of the Invention

The invention relates to an optical element, and more particularly, to an optical lens.

2. Description of Related Art

Wide-angle lenses with ultra-wide field of view (FOV) can capture images of the surrounding objects into the sensor, and have been widely used in products such as monitoring and sport cameras as well as drones. However, the wide-angle lenses can produce severe distortion aberration. In such case, users can reduce the distortion aberration in the images by software processing on the captured images with distortion aberration. However, because a resolution is lower at an edge portion of the images, a method like an interpolation is usually required to improve the resolution. Yet, distortions caused by different wide-angle lenses may have a slight difference from one another, and cannot be completely corrected simply by using one single parameter condition. Therefore, software processing for eliminating the distortion still requires further improvement.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an optical lens with wide viewing angle and low distortion.

Other objects and advantages of the invention can be further illustrated by the technical features broadly embodied and described as follows.

To achieve one, a part, or all of the objects or other objects, an embodiment of the invention propose an optical lens, which includes a first lens group and a second lens group. The first lens group includes a first lens, a second lens, and a third lens arranged in sequence from a magnified side towards a reduced side. Refractive powers of the first lens, the second lens, and the third lens are negative, negative and positive respectively. The third lens is a glass lens. The second lens group is disposed between the first lens group and the reduced side. The second lens group includes a fourth lens, a fifth lens, and a sixth lens arranged in sequence from the magnified side towards the reduced side. Refractive powers of the fourth lens, the fifth lens, and the sixth lens are positive, negative and positive respectively. The first lens, the second lens, the fourth lens, the fifth lens and the sixth lens are plastic lenses.

Based on the above, the embodiments of the invention have at least one the following advantages and effects. In the exemplary embodiments of the invention, according to overall configuration of the lenses in the optical lens, the optical lens can indeed provide the favorable optical quality with large aperture, wide viewing angle and low distortion.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
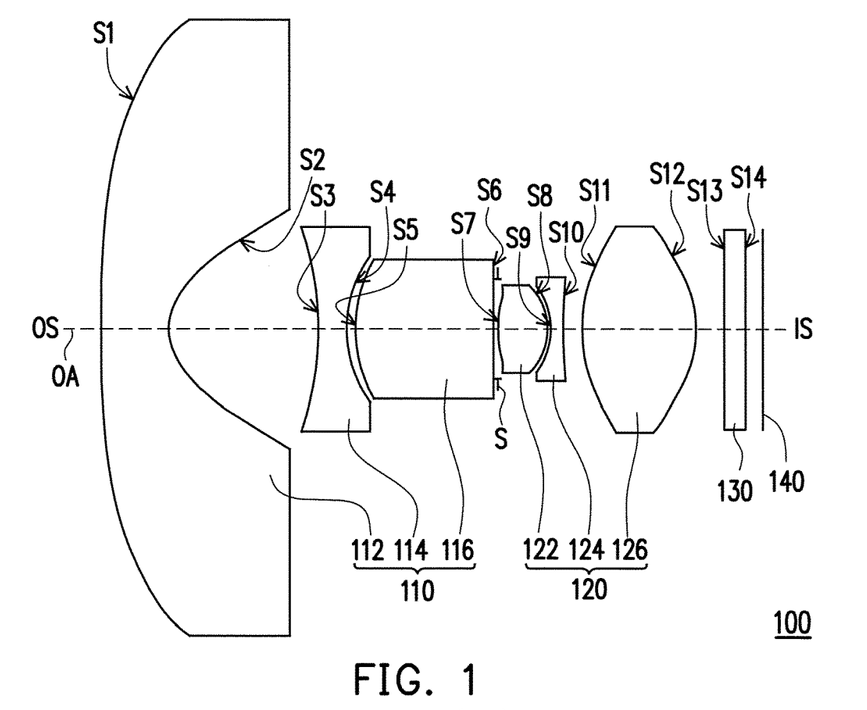
FIG. 1, FIG. 3, FIG. 5 and FIG. 7 are schematic diagrams illustrating optical lenses according to different embodiments of the invention.

FIG. 1 is a schematic diagram of an optical lens according to an embodiment of the invention. Referring to FIG. 1, an optical lens 100 of the embodiment includes a first lens group 110, an aperture stop S and a second lens group 120. In the embodiment, the first lens group 110, the aperture stop S and the second lens group 120 are arranged in sequence on an optical axis OA of the optical lens 100. In the embodiment, the first lens group 110 has a negative refractive power and is disposed between a magnified side OS and the second lens group 120. The second lens group 120 has a positive refractive power and is disposed between the first lens group 110 and a reduced side IS. The aperture stop S is disposed between the first lens group 110 and the second lens group 120.

In the embodiment, the first lens group 110 includes a first lens 112, a second lens 114, and a third lens 116 arranged in sequence from the magnified side OS towards the reduced side IS. Refractive powers of the first lens 112, the second lens 114 and the third lens 116 are negative, negative and positive respectively. In the embodiment, the first lens 112 and the second lens 114 are aspheric lenses, and the third lens 116 is a spheric lens. Specifically, in the embodiment, the first lens 112 is a convex-concave lens having a convex surface facing the magnified side OS, the second lens 114 is a biconcave lens, and the third lens 116 is a concave-convex lens having a convex surface facing the magnified side OS. In the embodiment, the first lens 112 and the second lens 114 are plastic lenses, and the third lens 116 is a glass lens. A refraction index of the third lens 116 is greater than 1.8, and an Abbe number of the third lens 116 is less than 25.

In the embodiment, the second lens group 120 includes a fourth lens 122, a fifth lens 124 and a sixth lens 126 arranged in sequence from the magnified side OS towards the reduced side IS. Refractive powers of the fourth lens 122, the fifth lens 124 and the sixth lens 126 are positive, negative and positive respectively. In the embodiment, the fourth lens 122, the fifth lens 124 and the sixth lens 126 are aspheric lenses. Specifically, in the present embodiment, the fourth lens 122 is a biconvex lens the fifth lens 124 is a biconcave lens, and the sixth lens 126 is a biconvex lens. In the present embodiment, the fourth lens 122, the fifth lens 124 and the sixth lens 126 are plastic lenses. Further, in the embodiment, the aperture stop S may be disposed alone between the first lens group 110 and the second lens group 120. In other embodiments, the aperture stop S may also be disposed on a surface of the third lens 116 facing the reduced side IS in the first lens group 110, or disposed on a surface of the fourth lens 122 facing the magnified side OS in the second lens group 120, which are not particularly limited by the invention.

In the embodiment, the optical lens 100 satisfies at least one of the following condition criteria:

1<|$f_{G1}/f_{G2}$|<2.2;

0.2<$f/f_{L3}$<0.3;

|TTL/$f_{G1}$|<6;

5<TTL/$f_{G2}$<6.5; and 0.9<$D_{L1}$/TTL<1, wherein $f_{G1}$ is an effective focal length of the first lens group 110, $f_{G2}$ is an effective focal length of the second lens group 120, f is an effective focal length of the optical lens 100, $f_{L3}$ is an effective focal length of the third lens 116, TTL is a total track length of the optical lens 100, and $D_{L1}$ is a clear aperture of the first lens 112.

One embodiment of the optical lens 100 is provided in the following content. It should be noted that, the data listed in Table 1 and Table 2 are not intended to limit the invention. It should be known to those ordinary skilled in the art that modifications can be made to the parameters and settings of the invention with reference to the invention, and such modifications still fall with the scope of the invention.

TABLE 1

| Surface | Curvature radius (mm) | Distance (mm) | Refractive Index | Abbe Number | Remark |
|---|---|---|---|---|---|
| S1 | 62.20368 | 2.8602 | 1.53 | 55.7 | First Lens |
| S2 | 2.34173 | 6.1974 | Air | | |
| S3 | −11.2065 | 1.15 | 1.53 | 56.3 | Second Lens |
| S4 | 7.66534 | 0.3408 | Air | | |
| S5 | 5.76506 | 5.7243 | 1.92 | 18.9 | Third Lens |
| S6 | 17.76944 | 0.1387 | Air | | |
| S | Infinity | 0.1 | Air | | Aperture Stop |
| S7 | 4.54525 | 2.0511 | 1.53 | 56.3 | Fourth Lens |
| S8 | −3.21839 | 0.1 | Air | | |
| S9 | −5.72018 | 0.5 | 1.65 | 21.5 | Fifth Lens |
| S10 | 9.89569 | 0.8173 | Air | | |
| S11 | 4.74543 | 4.6835 | 1.53 | 56.3 | Sixth Lens |
| S12 | −4.85619 | 1.2868 | Air | | |
| S13 | Infinity | 0.8 | 1.52 | 64.2 | Cover Glass |
| S14 | Infinity | 0.63 | Air | | |
| 140 | Infinity | 0 | Air | | Image source |

In Table 1, "Distance" refers a straight line distance between two adjacent surfaces on the optical axis OA of the optical lens 100. For example, the distance of a surface S1 refers a straight line distance from the surface S1 to a surface S2 on the optical axis OA. "Thickness", "Refractive Index", and "Abbe Number" corresponding to each of the lenses listed in the "Remark" column refers to the corresponding values of the distance, the refractive index, and the Abbe number in the same row. In addition, in Table 1, the surface S1 and the surface S2 are two opposite surfaces of the first lens 112. Further, the surface S1 is the surface facing the magnified side OS, and the surface S2 is the surface facing the reduced side IS. The surface S3 and the surface S4 are two opposite surfaces of the second lens 114. Further, the surface S3 is the surface facing the magnified side OS, and the surface S4 is the surface facing the reduced side IS. The surface S5 and the surface S6 are two opposite surfaces of the third lens 116. Further, the surface S5 is the surface facing the magnified side OS, and the surface S6 is the surface facing the reduced side IS. The surface S7 and the surface S8 are two opposite surfaces of the fourth lens 122. Further, the surface S7 is the surface facing the magnified side OS, and the surface S8 is the surface facing the reduced side IS. The surface S9 and the surface S10 are two opposite surfaces of the fifth lens 124. Further, the surface S9 is the surface facing the magnified side OS, and the surface S10 is the surface facing the reduced side IS. The surface S11 and the surface S12 are two opposite surfaces of the sixth lens 126. Further, the surface S11 is the surface facing the magnified side OS, and the surface S12 is the surface facing the reduced side IS. The surface S13 and the surface S14 are two opposite surfaces of a protection cover 130. Further, the surface S13 is the surface facing the magnified side OS, and the surface S14 is the surface facing the reduced side IS.

The surface S1 to the surface S4 and the surface S7 to the surface S12 are even polynomial aspheric surfaces, which may be represented by the following equation:

$$Z = \frac{(1/R) \times \varphi^2}{1 + \sqrt{1 - (1+c) \times (\varphi/R)^2}} + A \times \varphi^4 + B \times \varphi^6 + C \times \varphi^8 + D \times \varphi^{10} + E \times \varphi^{12} + F \times \varphi^{14} + G \times \varphi^{16} + H \times \varphi^{18} + J \times \varphi^{20}$$

In the equation, Z is a deviation (sag) in a direction of the optical axis OA, and R is a radius of an osculating sphere, that is, a curvature radius close to the optical axis OA (e.g., the curvature radiuses of the surface S1 to the surface S4 and the surface S7 to the surface S12 in Table 1). c is a quadratic surface coefficient (conic). φ is an aspheric height, that is, a height from a center of the lens to an edge of the lens. A, B, C, D, E, F, G, H and J are aspheric coefficients. Table 2 below lists aspheric parameter values of the surface S1 to the surface S4 and the surface S7 to the surface S12.

TABLE 2

| Surface | c | A | B | C | D |
|---------|---|---|---|---|---|
| S1  | 21.25346  | 1.0420E−04  | −2.8210E−07 | −1.0598E−08 | 2.3920E−10  |
| S2  | −1.02007  | 6.7245E−04  | −3.2766E−05 | 1.3081E−05  | −2.0885E−06 |
| S3  | 1.59177   | −2.7968E−03 | 4.3515E−04  | −2.3177E−05 | 6.0822E−07  |
| S4  | −11.1378  | 4.2361E−03  | 3.7055E−04  | −1.3538E−05 | 5.0002E−06  |
| S7  | −9.61174  | 1.1167E−02  | −2.9407E−03 | −9.9849E−04 | 9.0473E−04  |
| S8  | −1.32117  | −5.6034E−02 | 2.4441E−02  | −1.0664E−02 | 2.2490E−03  |
| S9  | −8.02811  | −7.0002E−02 | 2.6054E−02  | −4.4804E−03 | −5.2707E−03 |
| S10 | −0.0676   | −2.1331E−02 | 1.2519E−02  | −4.3128E−03 | 8.6959E−04  |
| S11 | −9.11196  | 8.0661E−04  | 3.7396E−04  | −7.2501E−05 | 7.2036E−06  |
| S12 | −1.34827  | −2.8529E−03 | 3.1690E−04  | −1.7902E−05 | 1.2134E−06  |

| Surface | E | F | G | H | J |
|---------|---|---|---|---|---|
| S1  | −2.5615E−12 | 1.6165E−14  | −5.6538E−17 | 8.5814E−20  | 0.0000E+00 |
| S2  | 1.9336E−07  | −1.0916E−08 | 3.1518E−10  | −3.5109E−12 | 0.0000E+00 |
| S3  | −6.4528E−09 | 0.0000E+00  | 0.0000E+00  | 0.0000E+00  | 0.0000E+00 |
| S4  | −3.3605E−07 | 0.0000E+00  | 0.0000E+00  | 0.0000E+00  | 0.0000E+00 |
| S7  | −4.9193E−04 | 0.0000E+00  | 0.0000E+00  | 0.0000E+00  | 0.0000E+00 |
| S8  | −2.3438E−04 | 0.0000E+00  | 0.0000E+00  | 0.0000E+00  | 0.0000E+00 |
| S9  | 4.0861E−03  | −1.4059E−03 | 2.4669E−04  | −1.6629E−05 | 0.0000E+00 |
| S10 | −9.4312E−05 | 4.4323E−06  | 0.0000E+00  | 0.0000E+00  | 0.0000E+00 |
| S11 | −4.0529E−07 | 1.0959E−08  | −3.0688E−11 | −3.4849E−12 | 0.0000E+00 |
| S12 | −5.0191E−08 | 6.4517E−10  | 0.0000E+00  | 0.0000E+00  | 0.0000E+00 |

In the above table, "1.6165E−14" refers to $1.6165 \times 10^{-14}$, and the rest of the values may be deduced by analogy. In the embodiment, a field of view (FOV) of the optical lens 100 is 131 degrees. A distortion rate is 0.18%. The effective focal length f of the optical lens 100 is 1.82 mm. An F-number is 2.5. The total track length TTL of the optical lens 100 is 27.38 mm, the effective focal length $|f_{G1}|$ of the first lens group 110 is 4.58 mm, the effective focal length $f_{G2}$ of the second lens group 120 is 4.50 mm, the effective focal length $f_{L3}$ of the third lens 116 is 7.52 mm, and the clear aperture $D_{L1}$ of the first lens 112 is 25.4 mm.

Figure 2:
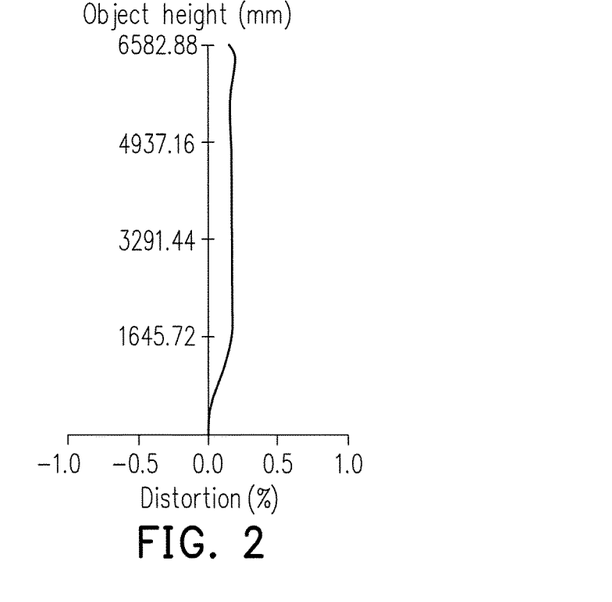
FIG. 2, FIG. 4, FIG. 6 and FIG. 8 are distortion maps of the optical lenses of FIG. 1, FIG. 3, FIG. 5 and FIG. 7, respectively.

FIG. 2 is a distortion map of the optical lens in FIG. 1. FIG. 2 illustrates a graph simulated with a light having a wavelength of 587.6 nm. In view of FIG. 2, as an object height (mm) increases, a variation in a distortion (%) falls within the range of the criteria. Therefore, the optical lens 100 of the embodiment can provide the favorable optical quality with high viewing angle and low distortion, which are applicable in large aperture design architecture for low illumination. Further, the resolution at the edge portion of the images captured by using the optical lens 100 may be improved.

Figure 3:
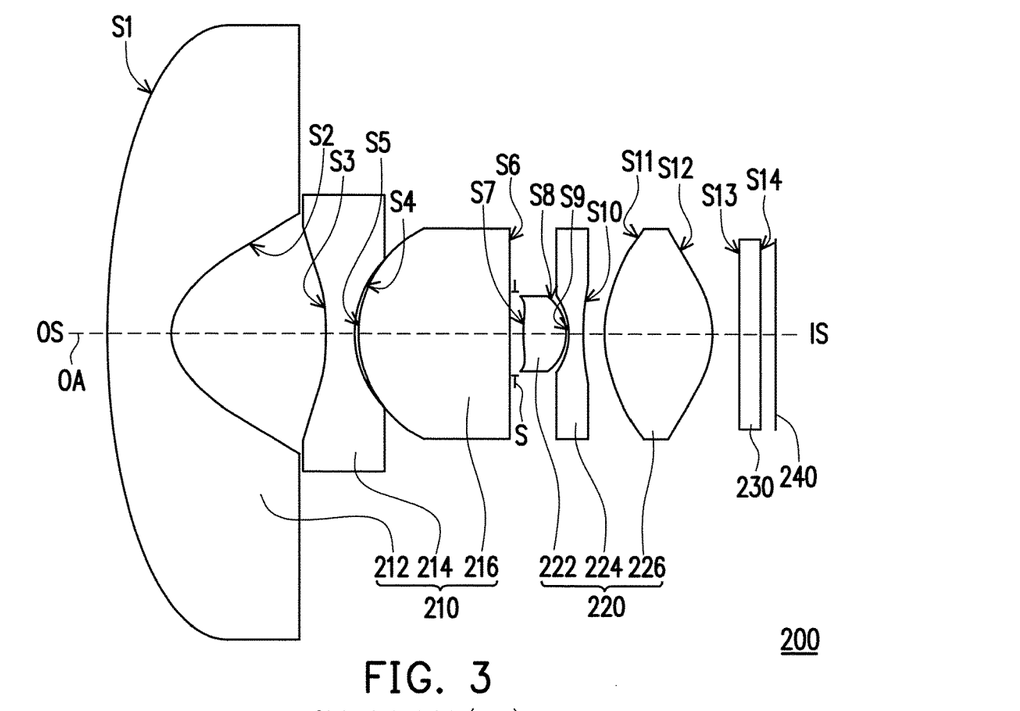

FIG. 3 is a schematic diagram of an optical lens according to another embodiment of the invention. Referring to FIG. 3, an optical lens 200 of the embodiment includes a first lens group 210, an aperture stop S and a second lens group 220. In the embodiment, the first lens group 210, the aperture stop S and the second lens group 220 are arranged in sequence on an optical axis OA of the optical lens 200. In the embodiment, the first lens group 210 has a negative refractive power and is disposed between a magnified side OS and the second lens group 220. The second lens group 220 has a positive refractive power and is disposed between the first lens group 210 and a reduced side IS. The aperture stop S is disposed between the first lens group 210 and the second lens group 220.

In the embodiment, the first lens group 210 includes a first lens 212, a second lens 214, and a third lens 216 arranged in sequence from the magnified side OS towards the reduced side IS. Refractive powers of the first lens 212, the second lens 214 and the third lens 216 are negative, negative and positive respectively. In the embodiment, the first lens 212 and the second lens 214 are aspheric lenses, and the third lens 216 is a spheric lens. Specifically, in the embodiment, the first lens 212 is a convex-concave lens having a convex surface facing the magnified side OS, the second lens 214 is a biconcave lens, and the third lens 216 is a concave-convex lens having a convex surface facing the magnified side OS. In the embodiment, the first lens 212 and the second lens 214 are plastic lenses, and the third lens 216 is a glass lens. A refraction index of the third lens 216 is greater than 1.8, and an Abbe number of the third lens 216 is less than 25.

In the embodiment, the second lens group 220 includes a fourth lens 222, a fifth lens 224 and a sixth lens 226 arranged in sequence from the magnified side OS towards the reduced side IS. Refractive powers of the fourth lens 222, the fifth lens 224 and the sixth lens 226 are positive, negative and positive respectively. In the embodiment, the fourth lens 222, the fifth lens 224 and the sixth lens 226 are aspheric lenses. Specifically, in the embodiment, the fourth lens 222 is a biconvex lens the fifth lens 224 is a biconcave lens, and the sixth lens 226 is a biconvex lens. In the embodiment, the fourth lens 222, the fifth lens 224 and the sixth lens 226 are plastic lenses.

In the embodiment, the optical lens 200 satisfies at least one of the following condition criteria:

$1 < |f_{G1}/f_{G2}| < 2.2$;

$0.2 < f/f_{L3} < 0.3$;

$|TTL/f_{G1}| < 6$;

$5 < TTL/f_{G2} < 6.5$; and $0.9 < D_{L1}/TTL < 1$, wherein $f_{G1}$ is an effective focal length of the first lens group 210, $f_{G2}$ is an effective focal length of the second lens group 220, f is an effective focal length of the optical lens 200, $f_{L3}$ is an effective focal length of the third lens 216, TTL is a total track length of the optical lens 200, and $D_{L1}$ is a clear aperture of the first lens 212.

One embodiment of the optical lens 200 is provided in the following content. It should be noted that, the data listed in Table 3 and Table 4 are not intended to limit the invention. It should be known to those ordinary skilled in the art that modifications can be made to the parameters and settings of the invention with references in the invention, and such modifications still falls with the scope of the invention.

TABLE 3

| Surface | Curvature radius (mm) | Distance (mm) | Refractive Index | Abbe Number | Remark |
|---|---|---|---|---|---|
| S1 | 62.97133 | 2.6421 | 1.54 | 55.9 | First Lens |
| S2 | 2.41064 | 6.5898 | Air | | |
| S3 | −11.2592 | 1.2 | 1.54 | 55.9 | Second Lens |
| S4 | 7.37932 | 0.1991 | Air | | |
| S5 | 5.32164 | 6.3068 | 1.92 | 21.28 | Third Lens |
| S6 | 21.22204 | 0.1322 | Air | | |
| S | Infinity | 0.1001 | Air | | Aperture Stop |
| S7 | 5.55268 | 1.7975 | 1.54 | 55.9 | Fourth Lens |
| S8 | −2.34737 | 0.1 | Air | | |
| S9 | −3.8764 | 0.5549 | 1.65 | 21.6 | Fifth Lens |
| S10 | 9.51182 | 0.9377 | Air | | |
| S11 | 4.91696 | 4.5905 | 1.54 | 55.9 | Sixth Lens |
| S12 | −5.06751 | 1.2213 | Air | | |
| S13 | Infinity | 0.8 | 1.52 | 64.2 | Cover Glass |
| S14 | Infinity | 0.63 | Air | | |
| 240 | Infinity | 0 | Air | | Image source |

In Table 3, "Distance" refers a straight line distance between two adjacent surfaces on the optical axis OA of the optical lens 200. For example, the distance of a surface S1 refers a straight line distance from the surface S1 to a surface S2 on the optical axis OA. "Thickness", "Refractive Index", and "Abbe Number" corresponding to each of the lenses listed in the "Remark" column refers to the corresponding values of the distance, the refractive index, and the Abbe number in the same row. In addition, in Table 3, the surface S1 and the surface S2 are two opposite surfaces of the first lens 212. Further, the surface S1 is the surface facing the magnified side OS, and the surface S2 is the surface facing the reduced side IS. The surface S3 and the surface S4 are two opposite surfaces of the second lens 214. Further, the surface S3 is the surface facing the magnified side OS, and the surface S4 is the surface facing the reduced side IS. The surface S5 and the surface S6 are two opposite surfaces of the third lens 216. Further, the surface S5 is the surface facing the magnified side OS, and the surface S6 is the surface facing the reduced side IS. The surface S7 and the surface S8 are two opposite surfaces of the fourth lens 222. Further, the surface S7 is the surface facing the magnified side OS, and the surface S8 is the surface facing the reduced side IS. The surface S9 and the surface S10 are two opposite surfaces of the fifth lens 224. Further, the surface S9 is the surface facing the magnified side OS, and the surface S10 is the surface facing the reduced side IS. The surface S11 and the surface S12 are two opposite surfaces of the sixth lens 226. Further, the surface S11 is the surface facing the magnified side OS, and the surface S12 is the surface facing the reduced side IS. The surface S13 and the surface S14 are two opposite surfaces of a protection cover 230. Further, the surface S13 is the surface facing the magnified side OS, and the surface S14 is the surface facing the reduced side IS.

The surface S1 to the surface S4 and the surface S7 to the surface S12 are even polynomial aspheric surfaces, which may be represented by the following equation:

$$Z = \frac{(1/R) \times \varphi^2}{1 + \sqrt{1 - (1+c) \times (\varphi/R)^2}} + A \times \varphi^4 + B \times \varphi^6 + C \times \varphi^8 +$$
$$D \times \varphi^{10} + E \times \varphi^{12} + F \times \varphi^{14} + G \times \varphi^{16} + H \times \varphi^{18} + J \times \varphi^{20}$$

In the equation, Z is a deviation (sag) in a direction of the optical axis OA, and R is a radius of an osculating sphere, that is, a curvature radius close to the optical axis OA (e.g., the curvature radiuses of the surface S1 to the surface S4 and the surface S7 to the surface S12 in Table 3). c is a quadratic surface coefficient (conic). φ is an aspheric height, that is, a height from a center of the lens to an edge of the lens. A, B, C, D, E, F, G, H and J are aspheric coefficients. Table 4 below lists aspheric parameter values of the surface S1 to the surface S4 and the surface S7 to the surface S12.

TABLE 4

| Surface | c | A | B | C | D |
|---|---|---|---|---|---|
| S1 | 21.68089 | 1.2736E−04 | −8.0728E−07 | −2.6637E−09 | 1.3148E−10 |
| S2 | −1.02867 | 5.6512E−04 | −1.5306E−05 | 8.4725E−06 | −1.1783E−06 |
| S3 | 2.58617 | −4.1845E−03 | 5.5788E−04 | −2.8011E−05 | 7.0868E−07 |
| S4 | −9.99961 | 2.3653E−04 | 4.3497E−04 | −1.6060E−05 | 3.1040E−06 |
| S7 | −15.8602 | 3.0577E−03 | −5.7688E−03 | −5.8506E−04 | 4.3176E−04 |
| S8 | −1.73663 | −4.1184E−02 | 2.5564E−02 | −1.6472E−02 | 4.6819E−03 |
| S9 | −25.9694 | −9.0949E−02 | 7.2387E−02 | −4.2056E−02 | 1.4121E−02 |
| S10 | 5.33915 | −1.5246E−02 | 1.4349E−02 | −6.2525E−03 | 1.5028E−03 |
| S11 | −9.6154 | 5.3673E−04 | 3.7222E−04 | −6.5065E−05 | 6.3005E−06 |
| S12 | −0.97788 | −3.1562E−03 | 3.7862E−04 | −2.5589E−05 | 1.8902E−06 |

| Surface | E | F | G | H | J |
|---|---|---|---|---|---|
| S1 | −1.4642E−12 | 9.0501E−15 | −3.0787E−17 | 4.5956E−20 | 0.0000E+00 |
| S2 | 9.9235E−08 | −5.4991E−09 | 1.5658E−10 | −1.6945E−12 | 0.0000E+00 |
| S3 | −7.1771E−09 | 0.0000E+00 | 0.0000E+00 | 0.0000E+00 | 0.0000E+00 |
| S4 | −2.0090E−07 | 0.0000E+00 | 0.0000E+00 | 0.0000E+00 | 0.0000E+00 |
| S7 | −6.3631E−04 | 0.0000E+00 | 0.0000E+00 | 0.0000E+00 | 0.0000E+00 |
| S8 | −6.0278E−04 | 0.0000E+00 | 0.0000E+00 | 0.0000E+00 | 0.0000E+00 |
| S9 | −2.4870E−03 | 1.2009E−04 | 2.8306E−05 | −3.0501E−06 | 0.0000E+00 |
| S10 | −1.9289E−04 | 1.0461E−05 | 0.0000E+00 | 0.0000E+00 | 0.0000E+00 |
| S11 | −3.7874E−07 | 1.3781E−08 | −2.7333E−10 | 2.2178E−12 | 0.0000E+00 |
| S12 | −8.3079E−08 | 1.3825E−09 | 0.0000E+00 | 0.0000E+00 | 0.0000E+00 |

In the above table, "1.2736E-04" refers to 1.2736×10⁻⁴, and the rest of the values may be deduced by analogy. In the embodiment, a field of view (FOV) of the optical lens 200 is 131 degrees. A distortion rate is 0.14%. The effective focal length f of the optical lens 200 is 1.82 mm. An F-number is 2.5. The total track length TTL of the optical lens 200 is 27.80 mm, the effective focal length $|f_{G1}|$ of the first lens group 210 is 5.73 mm, the effective focal length $f_{G2}$ of the second lens group 220 is 4.99 mm, the effective focal length $f_{L3}$ of the third lens 216 is 6.72 mm, and the clear aperture $D_{L1}$ of the first lens 212 is 25.4 mm.

Figure 4:
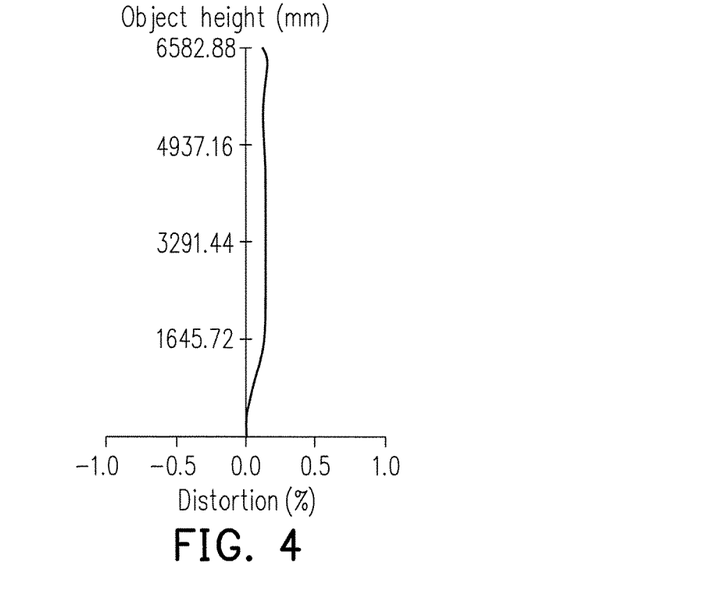

FIG. 4 is a distortion map of the optical lens in FIG. 3. FIG. 4 illustrates a graph simulated with a light having a wavelength of 587.6 nm. In view of FIG. 4, as an object height (mm) increases, a variation in a distortion (%) falls within the range of the criteria. Therefore, the optical lens 200 of the embodiment can provide the favorable optical quality with high viewing angle and low distortion, which are applicable in large aperture design architecture for low illumination. Further, the resolution at the edge portion of the images captured by using the optical lens 200 may be improved.

Figure 5:
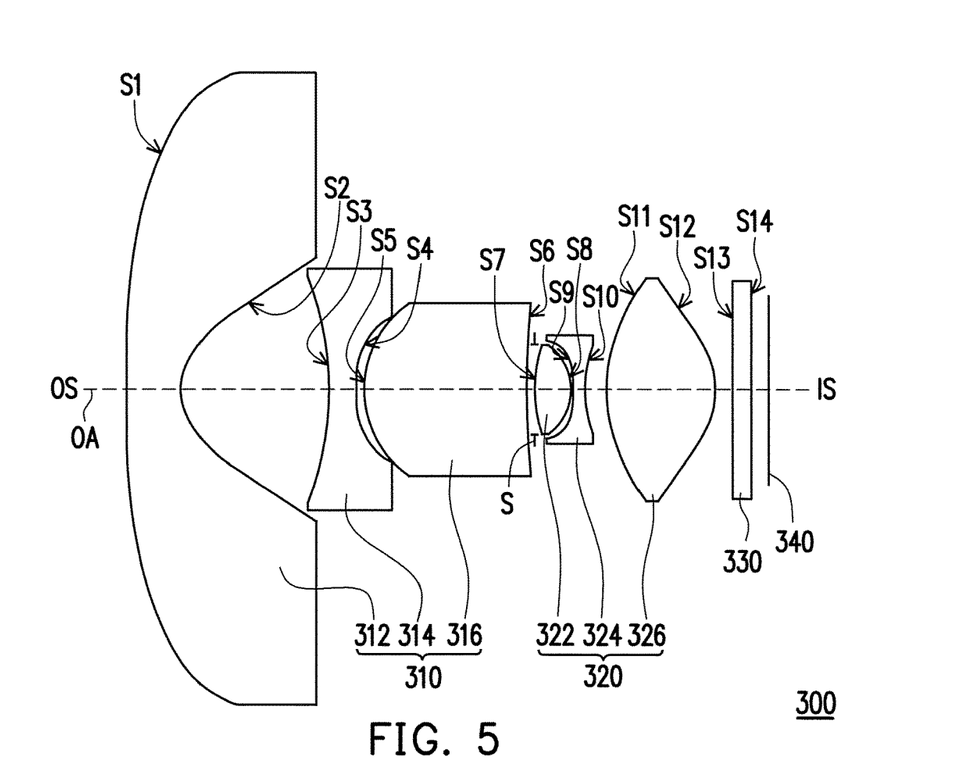

FIG. 5 is a schematic diagram of an optical lens according to another embodiment of the invention. Referring to FIG. 5, an optical lens 300 of the embodiment includes a first lens group 310, an aperture stop S and a second lens group 320. In the embodiment, the first lens group 310, the aperture stop S and the second lens group 320 are arranged in sequence on an optical axis OA of the optical lens 300. In the embodiment, the first lens group 310 has a negative refractive power and is disposed between a magnified side OS and the second lens group 320. The second lens group 320 has a positive refractive power and is disposed between the first lens group 310 and a reduced side IS. The aperture stop S is disposed between the first lens group 310 and the second lens group 320.

In the embodiment, the first lens group 310 includes a first lens 312, a second lens 314, and a third lens 316 arranged in sequence from the magnified side OS towards the reduced side IS. Refractive powers of the first lens 312, the second lens 314 and the third lens 316 are negative, negative and positive respectively. In the embodiment, the first lens 312, the second lens 314 and the third lens 316 are aspheric lenses. Specifically, in the embodiment, the first lens 312 is a convex-concave lens having a convex surface facing the magnified side OS, the second lens 314 is a biconcave lens, and the third lens 316 is a concave-convex lens having a convex surface facing the magnified side OS. In the embodiment, the first lens 312 and the second lens 314 are plastic lenses, and the third lens 316 is a glass lens. A refraction index of the third lens 316 is greater than 1.8, and an Abbe number of the third lens 316 is less than 25.

In the embodiment, the second lens group 320 includes a fourth lens 322, a fifth lens 324 and a sixth lens 326 arranged in sequence from the magnified side OS towards the reduced side IS. Refractive powers of the fourth lens 322, the fifth lens 324 and the sixth lens 326 are positive, negative and positive respectively. In the embodiment, the fourth lens 322, the fifth lens 324 and the sixth lens 326 are aspheric lenses. Specifically, in the embodiment, the fourth lens 322 is a biconvex lens the fifth lens 324 is a biconcave lens, and the sixth lens 326 is a biconvex lens. In the embodiment, the fourth lens 322, the fifth lens 324 and the sixth lens 326 are plastic lenses.

In the embodiment, the optical lens 300 satisfies at least one of the following condition criteria:

$1 \leq |f_{G1}/f_{G2}| < 2.2;$ $0.2 < f/f_{L3} < 0.3;$ $|TTL/f_{G1}| < 6;$ $5 < TTL/f_{G2} < 6.5;$ and $0.9 < D_{L1}/TTL < 1,$ wherein $f_{G1}$ is an effective focal length of the first lens group 310, $f_{G2}$ is an effective focal length of the second lens group 320, f is an effective focal length of the optical lens 300, $f_{L3}$ is an effective focal length of the third lens 316, TTL is a total track length of the optical lens 300, and $D_{L1}$ is a clear aperture of the first lens 312.

One embodiment of the optical lens 300 is provided in the following content. It should be noted that, the data listed in Table 5 and Table 6 are not intended to limit the invention. It should be known to those ordinary skilled in the art that modifications can be made to the parameters and settings of the invention with references in the invention, and such modifications still falls with the scope of the invention.

TABLE 5

| Surface | Curvature radius (mm) | Distance (mm) | Refractive Index | Abbe Number | Remark |
|---|---|---|---|---|---|
| S1 | 74.97811 | 2.3505 | 1.54 | 55.9 | First Lens |
| S2 | 2.35379 | 6.378 | Air | | |
| S3 | −12.1269 | 1.2 | 1.54 | 55.9 | Second Lens |
| S4 | 8.77638 | 0.3927 | Air | | |
| S5 | 5.15202 | 7.1005 | 1.82 | 24.06 | Third Lens |
| S6 | 31.08261 | 0.1187 | Air | | |
| S | Infinity | 0.1356 | Air | | Aperture Stop |
| S7 | 4.19901 | 1.6033 | 1.54 | 55.9 | Fourth Lens |
| S8 | −2.79262 | 0.1 | Air | | |
| S9 | −5.15841 | 0.5 | 1.65 | 21.6 | Fifth Lens |
| S10 | 5.44703 | 0.8988 | Air | | |
| S11 | 5.40752 | 4.7329 | 1.54 | 55.9 | Sixth Lens |
| S12 | −4.39859 | 0.859 | Air | | |
| S13 | Infinity | 0.8 | 1.52 | 64.2 | Cover Glass |
| S14 | Infinity | 0.63 | Air | | |
| 340 | Infinity | 0 | Air | | Image source |

In Table 5, "Distance" refers a straight line distance between two adjacent surfaces on the optical axis OA of the optical lens 300. For example, the distance of a surface S1 refers a straight line distance from the surface S1 to a surface S2 on the optical axis OA. "Thickness", "Refractive Index", and "Abbe Number" corresponding to each of the lenses listed in the "Remark" column refers to the corresponding values of the distance, the refractive index, and the Abbe number in the same row. In addition, in Table 5, the surface S1 and the surface S2 are two opposite surfaces of the first lens 312. Further, the surface S1 is the surface facing the magnified side OS, and the surface S2 is the surface facing the reduced side IS. The surface S3 and the surface S4 are two opposite surfaces of the second lens 314. Further, the surface S3 is the surface facing the magnified side OS, and the surface S4 is the surface facing the reduced side IS. The surface S5 and the surface S6 are two opposite surfaces of the third lens 316. Further, the surface S5 is the surface facing the magnified side OS, and the surface S6 is the surface facing the reduced side IS. The surface S7 and the surface S8 are two opposite surfaces of the fourth lens 322. Further, the surface S7 is the surface facing the magnified side OS, and the surface S8 is the surface facing the reduced side IS. The surface S9 and the surface S10 are two opposite surfaces of the fifth lens 324. Further, the surface S9 is the surface facing the magnified side OS, and the surface S10 is the surface facing the reduced side IS. The surface S11 and the surface S12 are two opposite surfaces of the sixth lens 326. Further, the surface S11 is the surface facing the magnified side OS, and the surface S12 is the surface facing the reduced side IS. The surface S13 and the surface S14 are two opposite surfaces of a protection cover 330. Further, the surface S13 is the surface facing the magnified side OS, and the surface S14 is the surface facing the reduced side IS.

The surface S1 to the surface S12 are even polynomial aspheric surfaces that can be represented by the following equation:

$$Z = \frac{(1/R) \times \varphi^2}{1 + \sqrt{1-(1+c) \times (\varphi/R)^2}} + A \times \varphi^4 + B \times \varphi^6 + C \times \varphi^8 +$$
$$D \times \varphi^{10} + E \times \varphi^{12} + F \times \varphi^{14} + G \times \varphi^{16} + H \times \varphi^{18} + J \times \varphi^{20}$$

In the equation, Z is a deviation (sag) in a direction of the optical axis OA, and R is a radius of an osculating sphere, that is, a curvature radius close to the optical axis OA (e.g., the curvature radiuses of the surface S1 to the surface S12 in Table 5). c is a quadratic surface coefficient (conic). $\varphi$ is an aspheric height, that is, a height from a center of the lens to an edge of the lens. A, B, C, D, E, F, G, H and J are aspheric coefficients. Table 6 below lists the aspheric parameter values of the surface S1 to the surface S12.

TABLE 6

| Surface | c | A | B | C | D |
|---|---|---|---|---|---|
| S1 | 28.66601 | 7.9330E−05 | 7.8101E−07 | −3.5133E−08 | 5.7041E−10 |
| S2 | −1.12497 | 2.2151E−04 | 1.3624E−05 | 1.9758E−06 | −2.7063E−07 |
| S3 | 3.70051 | 2.5040E−04 | 3.8739E−05 | 5.9224E−07 | −9.8702E−08 |
| S4 | −7.8359 | 1.5778E−02 | −1.8209E−03 | 2.1389E−04 | −1.1039E−05 |
| S5 | 0.16271 | 5.4775E−03 | −1.1299E−03 | 1.0778E−04 | 1.2524E−06 |
| S6 | 13.63417 | −6.9124E−03 | 3.2905E−03 | −2.5667E−04 | 1.7288E−04 |
| S7 | −9.1012 | −6.0768E−09 | 7.1740E−14 | −4.6447E−19 | 1.3556E−24 |
| S8 | −2.34214 | −2.1900E−02 | −1.7221E−03 | 8.7942E−04 | 6.8793E−05 |
| S9 | −19.6152 | −3.1030E−02 | 4.0677E−03 | 1.2655E−03 | −1.4454E−03 |
| S10 | −1.23488 | −1.6010E−03 | 9.4625E−06 | −3.7869E−08 | 7.4767E−11 |
| S11 | −10.7792 | 1.3269E−03 | 1.0178E−04 | −1.9975E−05 | 1.6992E−06 |
| S12 | −0.51738 | −4.9905E−03 | 8.3715E−04 | −6.8141E−05 | 3.9921E−06 |

| Surface | E | F | G | H | J |
|---|---|---|---|---|---|
| S1 | −5.3929E−12 | 3.1519E−14 | −1.0497E−16 | 1.5287E−19 | 0.0000E+00 |
| S2 | 1.9873E−08 | −1.3334E−09 | 4.5657E−11 | −5.5407E−13 | 0.0000E+00 |
| S3 | 2.2463E−09 | 0.0000E+00 | 0.0000E+00 | 0.0000E+00 | 0.0000E+00 |
| S4 | 1.6892E−07 | 0.0000E+00 | 0.0000E+00 | 0.0000E+00 | 0.0000E+00 |
| S5 | −1.5691E−06 | 1.7369E−07 | −8.2000E−09 | 1.4407E−10 | 0.0000E+00 |
| S6 | 0.0000E+00 | 0.0000E+00 | 0.0000E+00 | 0.0000E+00 | 0.0000E+00 |
| S7 | −1.1801E−30 | 0.0000E+00 | 0.0000E+00 | 0.0000E+00 | 0.0000E+00 |
| S8 | −5.4889E−05 | 0.0000E+00 | 0.0000E+00 | 0.0000E+00 | 0.0000E+00 |
| S9 | 1.1990E−03 | −5.0101E−04 | 1.0239E−04 | −8.5405E−06 | 0.0000E+00 |
| S10 | −7.0183E−14 | 2.5151E−17 | 0.0000E+00 | 0.0000E+00 | 0.0000E+00 |
| S11 | −7.9595E−08 | 2.0033E−09 | −2.5295E−11 | 1.2586E−13 | 0.0000E+00 |
| S12 | −1.2205E−07 | 1.3627E−09 | 0.0000E+00 | 0.0000E+00 | 0.0000E+00 |

In the above table, "7.9330E-05" refers to 7.9330×10⁻⁵, and the rest of the values may be deduced by analogy. In the embodiment, a field of view (FOV) of the optical lens 300 is 131 degrees. A distortion rate is 0.43%. The effective focal length f of the optical lens 300 is 1.82 mm. An F-number is 2.5. The total track length TTL of the optical lens 300 is 27.8 mm, the effective focal length $|f_{G1}|$ of the first lens group 310 is 8.37 mm, the effective focal length $f_{G2}$ of the second lens group 320 is 5.26 mm, the effective focal length $f_{L3}$ of the third lens 316 is 6.69 mm, and the clear aperture $D_{L1}$ of the first lens 312 is 25.2 mm.

Figure 6:
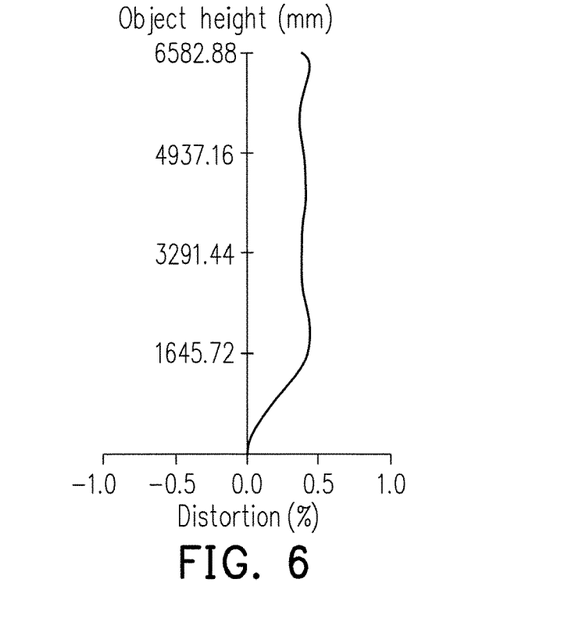

FIG. 6 is a distortion map of the optical lens in FIG. 5. FIG. 6 illustrates a graph simulated with a light having a wavelength of 587.6 nm. In view of FIG. 6, as an object height (mm) increases, a variation in a distortion (%) falls within the range of the criteria. Therefore, the optical lens 300 of the embodiment can provide the favorable optical quality with high viewing angle and low distortion, which are applicable in large aperture design architecture for low illumination. Further, the resolution at the edge portion of the images captured by using the optical lens 300 may be improved.

Figure 7:
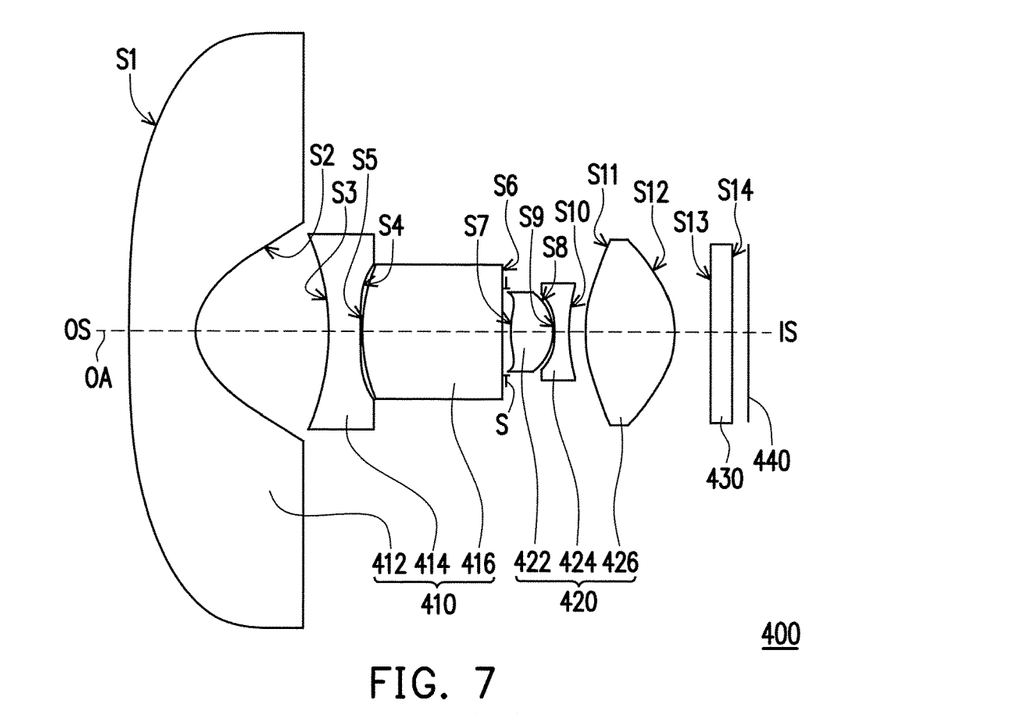

FIG. 7 is a schematic diagram of an optical lens according to another embodiment of the invention. Referring to FIG. 7, an optical lens 400 of the embodiment includes a first lens group 410, an aperture stop S and a second lens group 420. In the embodiment, the first lens group 410, the aperture stop S and the second lens group 420 are arranged in sequence on an optical axis OA of the optical lens 400. In the embodiment, the first lens group 410 has a negative refractive power and is disposed between a magnified side OS and the second lens group 420. The second lens group 420 has a positive refractive power and is disposed between the first lens group 410 and a reduced side IS. The aperture stop S is disposed between the first lens group 410 and the second lens group 420.

In the embodiment, the first lens group 410 includes a first lens 412, a second lens 414, and a third lens 416 arranged in sequence from the magnified side OS towards the reduced side IS. Refractive powers of the first lens 412, the second lens 414 and the third lens 416 are negative, negative and positive respectively. In the embodiment, the first lens 412 and the second lens 414 are aspheric lenses, and the third lens 416 is a spheric lens. Specifically, in the present embodiment, the first lens 412 is a convex-concave lens having a convex surface facing the magnified side OS, the second lens 414 is a biconcave lens, and the third lens 416 is a plane-convex lens having a convex surface facing the magnified side OS. In the embodiment, the first lens 412 and the second lens 414 are plastic lenses, and the third lens 416 is a glass lens. A refraction index of the third lens 416 is greater than 1.8, and an Abbe number of the third lens 416 is less than 25.

In the embodiment, the second lens group 420 includes a fourth lens 422, a fifth lens 424 and a sixth lens 426 arranged in sequence from the magnified side OS towards the reduced side IS. Refractive powers of the fourth lens 422, the fifth lens 424 and the sixth lens 426 are positive, negative and positive respectively. In the embodiment, the fourth lens 422, the fifth lens 424 and the sixth lens 426 are aspheric lenses. Specifically, in the present embodiment, the fourth lens 422 is a biconvex lens the fifth lens 424 is a biconcave lens, and the sixth lens 426 is a biconvex lens. In the embodiment, the fourth lens 422, the fifth lens 424 and the sixth lens 426 are plastic lenses.

In the embodiment, the optical lens 400 satisfies at least one of the following condition criteria:

$1 < |f_{G1}/f_{G2}| < 2.2$;

$0.2 < f/f_{L3} < 0.3$;

$|TTL/f_{G1}| < 6$;

$5 < TTL/f_{G2} < 6.5$; and $0.9 < D_{L1}/TTL < 1$, wherein $f_{G1}$ is an effective focal length of the first lens group 410, $f_{G2}$ is an effective focal length of the second lens group 420, f is an effective focal length of the optical lens 400, $f_{L3}$ is an effective focal length of the third lens 416, TTL is a total track length of the optical lens 400, and $D_{L1}$ is a clear aperture of the first lens 412.

One embodiment of the optical lens 400 is provided in the following content. It should be noted that, the data listed in Table 7 and Table 8 are not intended to limit the invention. It should be known to those ordinary skilled in the art that modifications can be made to the parameters and settings of the invention with references in the invention, and such modifications still falls with the scope of the invention.

TABLE 7

| Surface | Curvature radius (mm) | Distance (mm) | Refractive Index | Abbe Number | Remark |
|---|---|---|---|---|---|
| S1 | 62.37353 | 3.0263 | 1.54 | 56.2 | First Lens |
| S2 | 2.32363 | 5.9371 | Air | | |
| S3 | −13.7202 | 1.4 | 1.53 | 56.3 | Second Lens |
| S4 | 13.53303 | 0.1009 | Air | | |
| S5 | 7.52458 | 6.3019 | 1.92 | 18.9 | Third Lens |
| S6 | Infinity | 0.1 | Air | | |
| S | Infinity | 0.307 | Air | | Aperture Stop |
| S7 | 6.66887 | 1.8516 | 1.53 | 56.3 | Fourth Lens |
| S8 | −2.66935 | 0.1 | Air | | |
| S9 | −4.19707 | 0.6526 | 1.64 | 21.5 | Fifth Lens |
| S10 | 7.62444 | 0.71 | Air | | |
| S11 | 4.7503 | 4.0035 | 1.54 | 56.2 | Sixth Lens |
| S12 | −4.54917 | 1.5792 | Air | | |
| S13 | Infinity | 1 | 1.52 | 64.2 | Cover Glass |
| S14 | Infinity | 0.63 | Air | | |
| 440 | Infinity | 0 | Air | | Image source |

In Table 7, "Distance" refers a straight line distance between two adjacent surfaces on the optical axis OA of the optical lens 400. For example, the distance of a surface S1 refers a straight line distance from the surface S1 to a surface S2 on the optical axis OA. "Thickness", "Refractive Index", and "Abbe Number" corresponding to each of the lenses listed in the "Remark" column refers to the corresponding values of the distance, the refractive index, and the Abbe number in the same row. In addition, in Table 7, the surface S1 and the surface S2 are two opposite surfaces of the first lens 412. Further, the surface S1 is the surface facing the magnified side OS, and the surface S2 is the surface facing the reduced side IS. The surface S3 and the surface S4 are two opposite surfaces of the second lens 414. Further, the surface S3 is the surface facing the magnified side OS, and the surface S4 is the surface facing the reduced side IS. The surface S5 and the surface S6 are two opposite surfaces of the third lens 416. Further, the surface S5 is the surface facing the magnified side OS, and the surface S6 is the surface facing the reduced side IS. The surface S7 and the surface S8 are two opposite surfaces of the fourth lens 422. Further, the surface S7 is the surface facing the magnified side OS, and the surface S8 is the surface facing the reduced side IS. The surface S9 and the surface S10 are two opposite surfaces of the fifth lens 424. Further, the surface S9 is the surface facing the magnified side OS, and the surface S10 is the surface facing the reduced side IS. The surface S11 and the surface S12 are two opposite surfaces of the sixth lens 426. Further, the surface S11 is the surface facing the magnified side OS, and the surface S12 is the surface facing the reduced side IS. The surface S13 and the surface S14 are two opposite surfaces of a protection cover 430. Further, the surface S13 is the surface facing the magnified side OS, and the surface S14 is the surface facing the reduced side IS.

The surface S1 to the surface S4 and the surface S7 to the surface S12 are even polynomial aspheric surfaces, which may be represented by the following equation:

$$Z = \frac{(1/R) \times \varphi^2}{1 + \sqrt{1 - (1+c) \times (\varphi/R)^2}} + A \times \varphi^4 + B \times \varphi^6 + C \times \varphi^8 + D \times \varphi^{10} + E \times \varphi^{12} + F \times \varphi^{14} + G \times \varphi^{16} + H \times \varphi^{18} + J \times \varphi^{20}$$

In the equation, Z is a deviation (sag) in a direction of the optical axis OA, and R is a radius of an osculating sphere, that is, a curvature radius close to the optical axis OA (e.g., the curvature radiuses of the surface S1 to the surface S4 and the surface S7 to the surface S12 in Table 7). c is a quadratic surface coefficient (conic). φ is an aspheric height, that is, a height from a center of the lens to an edge of the lens. A, B, C, D, E, F, G, H and J are aspheric coefficients. Table 8 below lists aspheric parameter values of the surface S1 to the surface S4 and the surface S7 to the surface S12.

TABLE 8

| Surface | c | A | B | C | D |
|---|---|---|---|---|---|
| S1 | 21.56221 | −5.18963E−05 | 6.83649E−06 | −1.74904E−07 | 2.55928E−09 |
| S2 | −1.10717 | −4.59691E−04 | 3.18488E−04 | −7.50918E−05 | 1.23588E−05 |

TABLE 8-continued

| | | | | | |
|---|---|---|---|---|---|
| S3 | 5.40951 | −7.59269E−03 | 1.29011E−03 | −1.17048E−04 | 7.79544E−06 |
| S4 | −6.13255 | −3.22993E−03 | 1.28985E−03 | −9.29349E−05 | 2.99399E−07 |
| S7 | −14.51202 | 2.83955E−03 | −3.71651E−03 | −3.43473E−04 | 2.10646E−04 |
| S8 | −2.03372 | −5.09044E−02 | 2.26363E−02 | −1.12025E−02 | 2.84653E−03 |
| S9 | −22.96758 | −8.65517E−02 | 4.69459E−02 | −2.05329E−02 | 4.76571E−03 |
| S10 | 1.72221 | −2.06173E−02 | 1.30675E−02 | −4.56832E−03 | 9.16543E−04 |
| S11 | −11.65584 | −1.06300E−03 | 7.34321E−04 | −1.11426E−04 | 8.51379E−06 |
| S12 | −0.85538 | −2.71815E−03 | 2.09302E−05 | 7.16027E−05 | −1.51214E−05 |

| Surface | E | F | G | H | J |
|---|---|---|---|---|---|
| S1 | −2.36495E−11 | 1.39749E−13 | −5.05083E−16 | 9.90594E−19 | −7.53981E−22 |
| S2 | −1.20027E−06 | 6.96835E−08 | −2.44142E−09 | 4.79691E−11 | −4.05280E−13 |
| S3 | −3.91259E−07 | 1.40986E−08 | −3.30722E−10 | 4.28273E−12 | −2.03657E−14 |
| S4 | 1.05415E−06 | −1.06092E−07 | 3.14016E−09 | 0.00000E+00 | 0.00000E+00 |
| S7 | −2.94714E−04 | 0.00000E+00 | 0.00000E+00 | 0.00000E+00 | 0.00000E+00 |
| S8 | −3.38267E−04 | 0.00000E+00 | 0.00000E+00 | 0.00000E+00 | 0.00000E+00 |
| S9 | −3.72736E−04 | −1.64475E−05 | −4.35810E−06 | 1.54479E−06 | 0.00000E+00 |
| S10 | −9.81738E−05 | 4.37710E−06 | 0.00000E+00 | 0.00000E+00 | 0.00000E+00 |
| S11 | −2.50326E−07 | −1.02047E−08 | 1.01233E−09 | −2.30955E−11 | 0.00000E+00 |
| S12 | 1.79247E−06 | −1.21933E−07 | 4.36622E−09 | −6.40506E−11 | 0.00000E+00 |

In the above table, "−5.18963E−05" refers to −5.18963×10$^{−5}$, and the rest of the values may be deduced by analogy. In the embodiment, a field of view (FOV) of the optical lens 400 is 131 degrees. A distortion rate is 0.55%. The effective focal length f of the optical lens 400 is 1.82 mm. An F-number is 2.5. The total track length TTL of the optical lens 400 is 27.8 mm, the effective focal length |f$_{G1}$| of the first lens group 410 is 10.96 mm, the effective focal length f$_{G2}$ of the second lens group 420 is 5.14 mm, the effective focal length f$_{L3}$ of the third lens 416 is 8.15 mm, and the clear aperture D$_{L1}$ of the first lens 412 is 25.4 mm.

Figure 8:
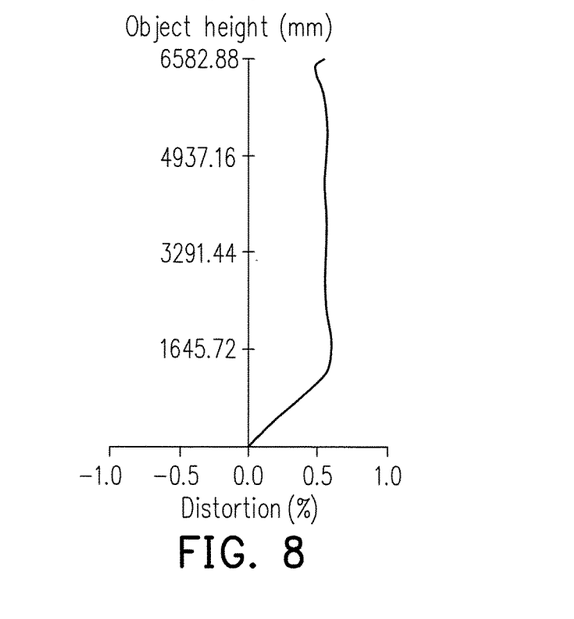

FIG. 8 is a distortion map of the optical lens in FIG. 7. FIG. 8 illustrates a graph simulated with a light having a wavelength of 587.6 nm. In view of FIG. 8, as an object height (mm) increases, a variation in a distortion (%) falls within the range of the criteria. Therefore, the optical lens 400 of the present embodiment can provide the favorable optical quality with high viewing angle and low distortion, which are applicable in large aperture design architecture for low illumination. Further, the resolution at the edge portion of the images captured by using the optical lens 400 may be improved.

In summary, the embodiments of the invention have at least one the following advantages and effects. In the exemplary embodiments of the invention, according to overall configuration of the lenses in the optical lens, the optical lens can indeed provide the favorable optical quality with high viewing angle and low distortion. In addition, the large aperture design architecture of the optical lens in the exemplary embodiments of the invention may at least be applied in environments with low illumination. Further, the resolution at the edge portion of the images captured by using the optical image may be improved. Moreover, the optical lens of the invention may be used as an image capturing fixed-focus lens, for example. In this case, the image sources 140, 240, 340 and 440 are, for example, imaging surfaces located at the reduced side IS, and the object height is, for example, a height of object to be captured at the magnified side OS.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens, comprising a first lens group and a second lens group, wherein
   the first lens group comprises a first lens, a second lens and a third lens arranged in sequence from a magnified side towards a reduced side, refractive powers of the first lens, the second lens and the third lens are negative, negative and positive respectively, and the third lens is a glass lens; and
   the second lens group is disposed between the first lens group and the reduced side and the second lens group comprises a fourth lens, a fifth lens, and a sixth lens arranged in sequence from the magnified side towards the reduced side, wherein refractive powers of the fourth lens, the fifth lens and the sixth lens are positive, negative and positive respectively, and the first lens, the second lens, the fourth lens, the fifth lens and the sixth lens are plastic lenses;

wherein the third lens is one of a concave-convex lens and a plane-convex lens, both having a convex surface facing the magnified side.

2. The optical lens according to claim 1, wherein the third lens is an aspheric lens.

3. The optical lens according to claim 1, wherein the third lens is a spheric lens.

4. The optical lens according to claim 1, wherein the first lens, the second lens, the fourth lens, the fifth lens and the sixth lens are aspheric lenses.

5. The optical lens according to claim 1, wherein the first lens is a convex-concave lens having a convex surface facing the magnified side, the second lens is a biconcave lens, the fourth lens is a biconvex lens, the fifth lens is a biconcave lens, and the sixth lens is a biconvex lens.

6. The optical lens according to claim 1, wherein the optical lens satisfies $1<|f_{G1}/f_{G2}|<2.2$, wherein $f_{G1}$ is an effective focal length of the first lens group, and $f_{G2}$ is an effective focal length of the second lens group.

7. The optical lens according to claim 1, wherein the optical lens satisfies $0.2<f/f_{L3}<0.3$, wherein f is an effective focal length of the optical lens, and fu is an effective focal length of the third lens.

8. The optical lens according to claim 1, wherein the optical lens satisfies $|TTL/f_{G1}|<6$, wherein $f_{G1}$ is an effective focal length of the first lens group, and TTL is a total track length of the optical lens.

9. The optical lens according to claim 1, wherein the optical lens satisfies $5<TTL/f_{G2}<6.5$, wherein $f_{G2}$ is an effective focal length of the second lens group, and TTL is a total track length of the optical lens.

10. The optical lens according to claim 1, wherein the optical lens satisfies $0.9<D_{L1}/TTL<1$, wherein $D_{L1}$ is a clear aperture of the first lens, and TTL is a total track length of the optical lens.

11. The optical lens according to claim 1, wherein a refraction index of the third lens is greater than 1.8, and an Abbe number of the third lens is less than 25.

12. The optical lens according to claim 1, further comprising: an aperture stop, the aperture stop being disposed between the first lens group and the second lens group.

* * * * *